(12) United States Patent
Peng

(10) Patent No.: US 6,717,988 B2
(45) Date of Patent: Apr. 6, 2004

(54) SCALABLE MPEG-2 DECODER

(75) Inventor: Shaomin Peng, Yorktown, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 675 days.

(21) Appl. No.: 09/759,042

(22) Filed: Jan. 11, 2001

(65) Prior Publication Data

US 2002/0122601 A1 Sep. 5, 2002

(51) Int. Cl.[7] .......................... H04N 7/12; H04N 11/02; H04N 11/04
(52) U.S. Cl. ................... 375/240.25; 375/240.18; 375/240.2
(58) Field of Search .................... 375/204.25, 240.18, 375/240.2

(56) References Cited

U.S. PATENT DOCUMENTS

| | | | | |
|---|---|---|---|---|
| 5,598,484 A | | 1/1997 | Suzuki et al. ............. 382/239 |
| 5,668,599 A | * | 9/1997 | Cheney et al. ......... 375/240.15 |
| 5,737,450 A | * | 4/1998 | Hajjahmad et al. ......... 382/260 |
| 5,872,866 A | * | 2/1999 | Strongin et al. ............. 382/233 |
| 5,903,311 A | * | 5/1999 | Ozcelik et al. .......... 375/240.2 |
| 5,982,431 A | * | 11/1999 | Chung .................... 375/240.01 |
| 6,009,505 A | * | 12/1999 | Thayer et al. .................. 712/6 |
| 6,462,681 B1 | * | 10/2002 | Van Der Vleuten et al. .. 341/50 |
| 6,519,288 B1 | * | 2/2003 | Vetro et al. ............ 375/240.21 |
| 6,532,263 B2 | * | 3/2003 | Radha et al. ............. 375/240.1 |
| 6,580,759 B1 | * | 6/2003 | Peng ..................... 375/240.25 |
| 6,640,015 B1 | * | 10/2003 | Lafruit et al. ................ 382/260 |

FOREIGN PATENT DOCUMENTS

EP            0595218 A1     4/1994          H04N/7/133

* cited by examiner

Primary Examiner—Andy Rao
Assistant Examiner—Charles E Parsons
(74) Attorney, Agent, or Firm—Michael E. Belk

(57) ABSTRACT

A video decoder system having a scalable IDCT system. Included is a system for determining a complexity level based on a complexity budget inputted from a local resource controller; and an IDCT system that selects a scaling algorithm from a plurality of scaling algorithms, wherein the selected scaling algorithm corresponds to the determined complexity level. Each of the plurality of scaling algorithms provides a unique data-pruning pattern for processing DCT data.

22 Claims, 5 Drawing Sheets

36

| ELIGIBLE ROWS | ELIGIBLE COLUMNS | COMPLEXITY LEVELS (%) |
|---|---|---|
| 8 | 8 | 100 |
| 8 | 6 | 91 |
| 8 | 4 | 86 |
| 6 | 8 | 78 |
| 6 | 6 | 72 |
| 4 | 8 | 61 |
| 6 | 3 | 60 |
| 5 | 5 | 59 |
| 4 | 4 | 55 |
| 5 | 3 | 54 |
| 4 | 3 | 50 |
| 4 | 2 | 45 |
| 3 | 3 | 38 |

FIG. 5

SCALABLE MPEG-2 DECODER

BACKGROUND OF THE INVENTION

1. Technical Field

The present invention relates to processing compressed video signals, and more particularly relates to a system and method for scaling an MPEG-2 video decoder using data pruning.

2. Related Art

The MPEG standards are an evolving set of standards for video and audio compression developed by the Moving Picture Experts Group (MPEG). MPEG-1 was designed for coding progressive video at a transmission rate of about 1.5 million bits per second. It was designed specifically for Video-CD and CD-i media. MPEG-2 was designed for coding interlaced images at transmission rates above 4 million bits per second. The MPEG-2 standard is used for various applications, such as digital television (DTV) broadcasts, digital versatile disk (DVD) technology, and video storage systems.

According to the MPEG-2 standard, a video sequence is divided into a series of GOPs (Group Of Pictures). Each GOP begins with an Intra-coded picture (I picture) followed by an arrangement of forward Predictive-coded pictures (P pictures) and Bi-directionally predictive-coded pictures (B pictures). I pictures are fields or frames coded as a stand-alone still image. P pictures are fields or frames coded relative to the nearest I or P picture, resulting in forward prediction processing. P pictures allow more compression than I pictures through the use of motion compensation, and also serve as a reference for B pictures and future P pictures. B pictures are coded with fields or frames that use the most proximate past and future I and P pictures as references, resulting in bi-directional prediction.

As digital TV gradually begins to dominate the TV market and other video applications become more desirable, the demand for systems having advanced capabilities for processing MPEG-2 pictures becomes stronger and stronger. The current emerging architecture for processing MPEG-2 pictures, such as that found in DTV set-top boxes and high end digital TV's, typically utilize a combination of a digital signal processing central processing units (DSPCPU), control processors, coprocessors, and software applications. Unfortunately, even with all these resources, advanced audio/visual processing functions tend to consume more computational power than is often available.

One of the key elements in MPEG-2 processing is the MPEG-2 decoder, which converts a bitstream of compressed MPEG-2 data into pixel images. The main components of a standard MPEG-2 decoder 10 are shown in FIG. 1. There are four functional blocks: a variable length decoder (VLD) 12, an inverse quantization (IQ) system 14, an inverse discrete cosine transform system (IDCT) 16, and a motion compensation (MC) system 18. Memory 20 is used to store the reference frames. The adder 22 combines the error residuals output from IDCT 16 with motion compensation results to form the final video output 24. Unfortunately, each of these functional components consume a significant amount of computational power, which drives up the cost, and limits the flexibility of digital video systems using MPEG-2 technology. Accordingly, making a highly efficient, cost effective decoder remains one of the main goals of all electronics manufacturers.

One solution for addressing the processing requirements of MPEG-2 decoders is to provide specialized hardware systems that increase computational power. Unfortunately, while overall hardware costs continue to decrease, the costs involved in designing and building specialized hardware such as this increase the expense of the decoder.

A preferred solution therefore is to implement as much functionality as possible in software, which provides significant cost and flexibility advantages over hardware solutions. In particular, software solutions reduce the need for expensive hardware, such as coprocessors, and will allow multiple video functions to run concurrently on a DSPCPU core. However, software applications tend to run too slow to handle occasions when computationally intensive decoding operations are required. Accordingly, a need exists to provide enhanced software systems that will provide inexpensive MPEG-2 decoder solutions while maintaining an acceptable level of video quality.

SUMMARY OF THE INVENTION

This invention overcomes the above-mentioned problems, as well as others, by providing a decoder having a scalable IDCT system that selects a unique data pruning pattern to meet a complexity budget allocated to the IDCT. In a first aspect, the invention provides a scalable IDCT system, comprising: a plurality of scaling algorithms; a system for receiving a complexity budget; a system for selecting one of the plurality of scaling algorithms based on the received complexity budget; and a system for processing an inputted block of discrete cosine transform (DCT) data using the selected scaling algorithm.

In a second aspect, the invention provides a video decoder system, comprising: a system for determining a complexity level based on an inputted complexity budget; and an IDCT system that selects a scaling algorithm from a plurality of scaling algorithms, wherein the selected scaling algorithm corresponds to the determined complexity level.

In a third aspect, the invention provides a method of scaling the processing of discrete cosine transform (DCT) blocks by an IDCT system in a video decoder, comprising the steps of: providing a complexity budget to the IDCT system; selecting one of a plurality of scaling algorithms based on the complexity budget; and processing at least one DCT block using the selected scaling algorithm.

In a fourth aspect, the invention provides a system for processing DCT data, comprising: a plurality of scaling algorithms, each capable of processing an inputted block of DCT data; a system for receiving a complexity budget; and a system for implementing one of the plurality of scaling algorithms to meet the received complexity budget.

In each of the above-mentioned aspects, each block of DCT data is comprised of DCT coefficients, and each of the plurality of scaling algorithms causes a unique pattern of DCT coefficients to be selected for processing. Moreover, each unique pattern of DCT coefficients selected for processing may comprise a rectangular arrangement of DCT coefficients having a predetermined number of rows and columns.

BRIEF DESCRIPTION OF THE DRAWINGS

The preferred exemplary embodiment of the present invention will hereinafter be described in conjunction with the appended drawings, where like designations denote like elements, and:

FIG. 5 depicts a complexity look-up table.

DETAILED DESCRIPTION OF THE INVENTION

Figure 1:
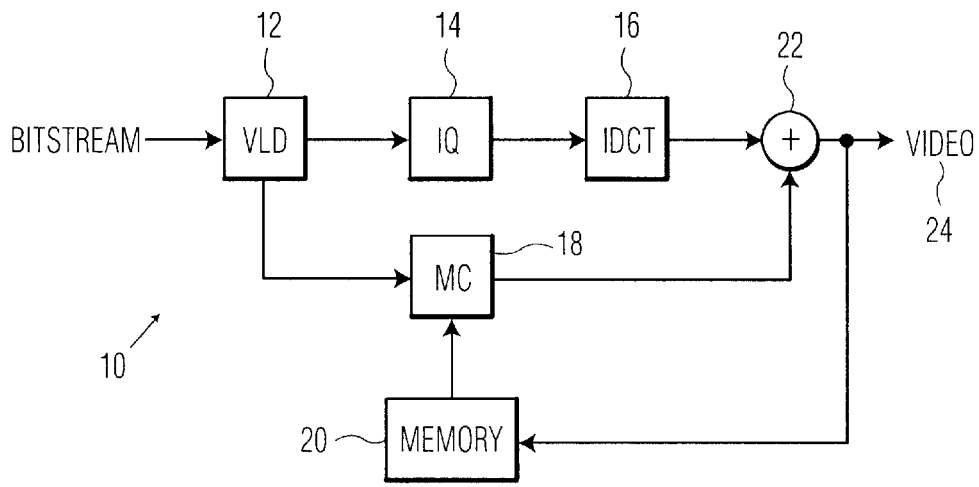
FIG. 1 depicts a functional diagram of a standard MPEG-2 video decoder.
Figure 2:
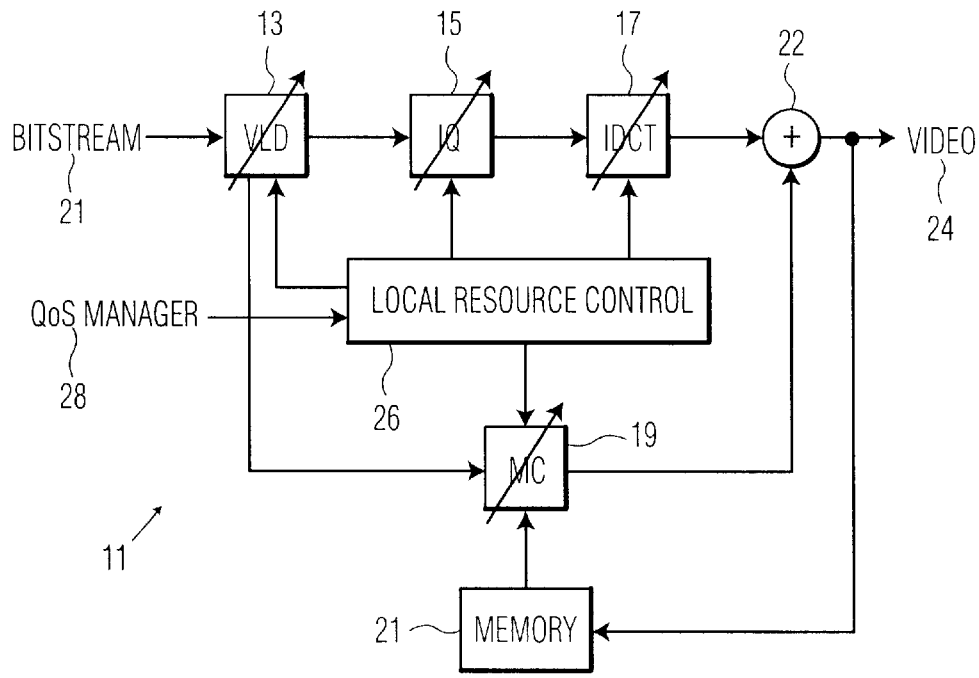
FIG. 2 depicts a functional diagram of a scalable MPEG-2 video decoder having a local resource controller.

A standard MPEG-2 decoder 10, as shown in FIG. 1, decodes an MPEG-2 bitstream 21 with four functional blocks, an adder 22, and memory 20. The functional blocks include a variable length decoder (VLD) 12, an inverse quantization (IQ) system 14, an inverse discrete cosine transform (IDCT) system 16, and a motion compensation (MC) system 18. In order to provide a more computationally scalable system, each of the above functional blocks within the decoder 10 can potentially be "scaled" to reduce the computational requirements of the particular block. FIG. 2 depicts a scalable decoder 11. Different scaling algorithms or applications have been proposed to selectively reduce the computational requirements, or complexity, of a given functional block. In general, scaling applications reduce the complexity of a functional block by reducing one or more computational processes, e.g., reducing certain processing steps and/or the processing of certain types of data. The price paid for reducing complexity is that such scaling applications will generally cause some picture degradation. Accordingly, the implementation of a scaling application must be chosen appropriately so as to balance computational reduction and output quality.

To meet the complexity constraints placed on decoder 11 of FIG. 2, a local resource controller 26 can be utilized to decide the individual scalability of each functional block in order to meet an overall required complexity for the decoder. The operation of local resource controller 26 may be controlled by a quality of service manager 28. In the embodiment described herein, a system for scaling IDCT system 17, which is generally regarded as the most computationally intensive functional block, is provided. Nonetheless, it should be understood that the invention described herein could be applied to any DCT based system, including other types of decoders and encoders that manipulate DCT data.

Figure 3:
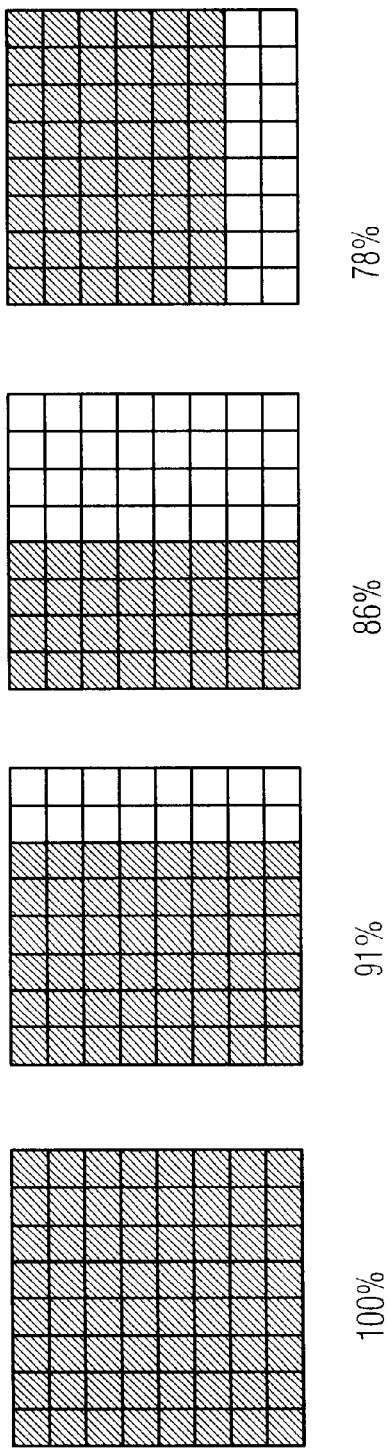
FIG. 3 depicts exemplary data pruning patterns for a scalable IDCT system.

Data is received by scalable IDCT system 17 in blocks of discrete cosine transform (DCT) data. Each block of DCT data is generally made up of 64 DCT coefficients arranged in an 8×8 grid. The present embodiment provides a plurality of data pruning algorithms to selectively reduce the processing of DCT data by IDCT system 17. FIG. 3 depicts eight exemplary data pruning patterns, along with their corresponding complexities. The shaded portions of each DCT block dictate those DCT coefficients that will be processed, and the un-shaded potions dictate those DCT coefficients that will be eliminated from processing.

The lower frequency components near the upper left corner of the DCT block are typically more critical to the decoded picture (i.e., they contain most of the picture information) than the higher frequency components around the lower right corner. Thus, both computational reduction and acceptable picture quality may be simultaneously achieved by an IDCT scaling algorithm that eliminates some of the high frequency components. However, as additional computational savings are required, more of the lower frequency components, which have greater energy and consume more computational power, must be eliminated. The trade-off for such savings, however, will be degradation of picture quality. Thus, the amount of pruning depends on the amount of computational power (i.e., complexity) budgeted for the IDCT. Specifically, as the complexity budget decreases, the amount of data pruning required increases.

In order to meet this objective, the input DCT data can be pruned with one of a plurality of available pruning patterns that will meet the complexity budget. As shown in FIG. 3, each available data pattern corresponds to a unique complexity level. It should be understood that any number of pruning patterns could be adopted. In addition, the chosen pruning patterns are for exemplary purposes only, and other configurations could be used.

Figure 4:
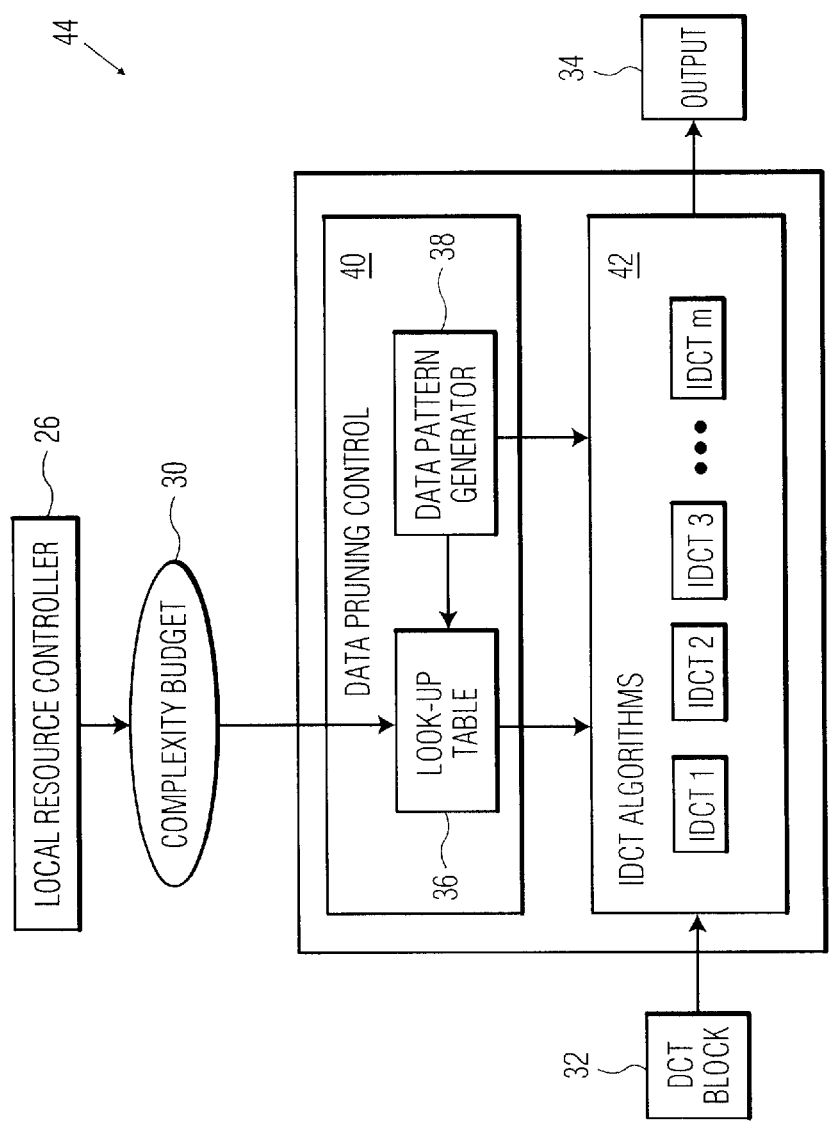
FIG. 4 depicts a scalable IDCT system in accordance with a preferred embodiment of the present invention.

Referring now to FIG. 4, a system for implementing such a scalable IDCT system 44 is depicted. The system 44 operates by receiving a complexity budget 30 from local resource controller 26. Complexity budget 30 is received by data pruning control 40, which passes the information to look-up table 36. An exemplary look-up table 36 is depicted in FIG. 5, which includes a plurality of complexity levels and associated pruning patterns (eligible row and columns). Based on the inputted complexity budget, an appropriate complexity level can be chosen. For instance, if a complexity budget of 80% was required, a complexity level of 78% may be chosen to meet the budget. Based on look-up table 36, the pruning pattern would be comprised of six rows and eight columns. The particular algorithm used to provide each pruning pattern can be implemented in any manner known or discoverable to one skilled in the art. An exemplary algorithm is described below.

Each complexity level is associated with one of a plurality of IDCT scaling algorithms 42, which will utilize the corresponding pruning pattern to process DCT block 32. Thus, once the appropriate complexity level is determined by data pruning control 40, a corresponding IDCT scaling algorithm is selected to process DCT block 32 and generate output 34. It should be understood that in the preferred embodiment, IDCT scaling algorithms 42 do not merely "zero-out" data that is to be eliminated from processing. Rather, each algorithm is implemented such that only the data selected for processing will be processed, and the remaining data is not processed. Thus, computations are not wasted operating on zeros, and no system is required to separately prune the data. Instead, the pruning is integrated into the selected IDCT scaling algorithm.

The process of designing look-up table 36, as well as corresponding IDCT algorithms 42, are preferably done "off-line" by data pattern generator 38. Thus, the number of complexity levels and the pruning patterns needed to achieve the patterns are determined ahead of time. Experimental results show that the complexity level can be scaled between 100% and 38% with graceful degradation of picture quality. However, subjective evaluation showed that although the quality level degrades at different complexity levels for sequences with different characteristics as the complexity level goes down, the output quality is visually acceptable for complexity levels higher than 55% for most sequences.

An exemplary IDCT algorithm may comprise a lattice-structured one-dimensional (1-D) DCT/IDCT transform implemented with 11 multiplications and 29 additions. Using column-row decompositions on 8×8 blocks, a 2-D IDCT can be implemented with 8×11×2=176 multiplications and 2×8×2=464 additions. The complexity measure used in the design is the ratio (percentage) of the number of multiplications and additions in the scalable algorithm over that of the standard IDCT computation, i.e.

$$C(\%) = \frac{\sum_{row=1}^{8} \sum_{coln=1}^{p \leq 8} (C_{mult} + C_{add})}{C_0} \times 100\%.$$

Where $C_{mult}$ and $C_{add}$ are the number of multiplications and additions in the scalable algorithm respectively, p is the number of columns of DCT block that are not pruned, and $C_0$ is the total number of multiplications and additions in the standard algorithm.

In the exemplary IDCT algorithm, the row-column decomposition order for IDCT computations is fixed, i.e., the column IDCT transforms are performed first in order to achieve better complexity reduction. The data pruning starts from the right and gradually spreads to the left, and from the bottom to the top. Once a data pattern is generated, the data is pruned or "masked" by removing blocks not in the pattern. Since the selected mask permanently masks this data out, all the corresponding branches in the lattice structure are removed. The new complexity level is calculated and stored in a complexity look-up-table 36. Some exemplary pruning masks are shown in FIG. 3 to further illustrate the data-pruning scheme. It is interesting to note that the mirrored versions do not have the same complexity levels due to the fixed order of IDCT computations within the same system.

Figure 6:
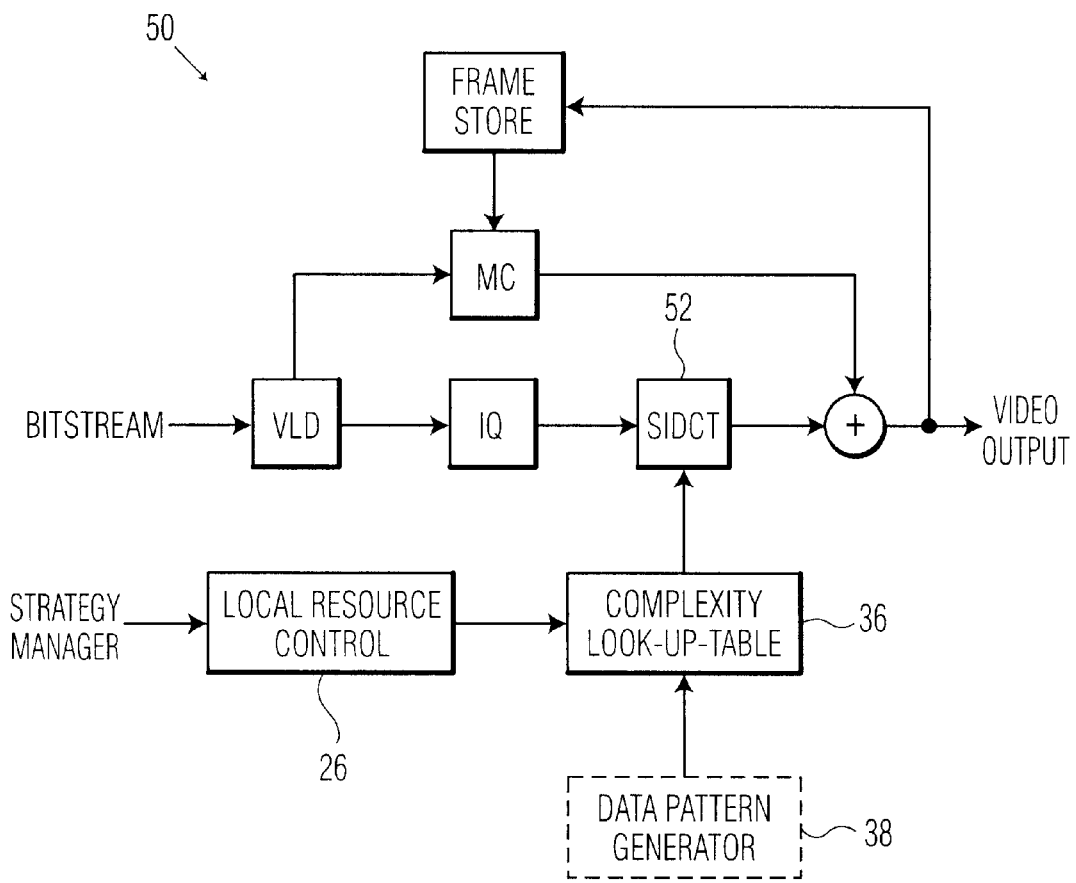
FIG. 6 depicts an MPEG-2 video decoder having a scalable IDCT system in accordance with a preferred embodiment of the present invention.

Referring now to FIG. 6, an MPEG-2 decoder 50 is shown having a scalable IDCT (SIDCT) functional block 52. As described above, local resource controller 26 submits a complexity budget to complexity look-up table 36, which then dictates the data-pruning pattern to be implemented by SIDCT 52. As noted, data pattern generator 38 is utilized to design the look-up table 36 and the corresponding SIDCT algorithms in the SIDCT functional block 52 in an "off-line" manner. The proposed SIDCT system provides the following features: (1) the scalable complexity levels are independent of any DCT data variation; (2) the complexity levels monotonically decrease as the complexity budget reduces; and (3) the output quality is gracefully degraded.

It is understood that systems and modules described herein can be implemented in hardware, software, or a combination of hardware and software. They may be implemented by any type of computer system—or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

We claim:

1. A scalable inverse discrete cosine transform (IDCT) system, comprising:
   a plurality of scaling algorithms;
   a system for receiving a complexity budget;
   a system for selecting one of the plurality of scaling algorithms based on the received complexity budget; and
   a system for processing an inputted block of discrete cosine transform (DCT) data using the selected scaling algorithm.

2. The scalable IDCT system of claim 1, wherein each of the plurality of scaling algorithms includes a unique data-pruning pattern.

3. The scalable IDCT system of claim 1, wherein the inputted block of DCT data is comprised of DCT coefficients, and each of the plurality of scaling algorithms causes a unique pattern of DCT coefficients to be selected for processing.

4. The scalable IDCT system of claim 3, wherein each different pattern of DCT coefficients selected for processing comprises a rectangular arrangement of DCT coefficients having a predetermined number of rows and columns.

5. The scalable IDCT system of claim 1, wherein the inputted block of DCT data is comprised of DCT coefficients, and wherein each of the plurality of scaling algorithms eliminates a predetermined pattern of DCT coefficients from processing.

6. The scalable IDCT system of claim 1, wherein the system for selecting one of the plurality of scaling algorithms based on the received complexity budget includes a table that associates data patterns with inputted complexity levels.

7. A video decoder system, comprising:
   a system for determining a complexity level based on an inputted complexity budget; and
   an inverse discrete cosine transform (IDCT) system that selects a scaling algorithm from a plurality of scaling algorithms, wherein the selected scaling algorithm corresponds to the determined complexity level.

8. The video decoder system of claim 7, wherein the complexity budget is received from a local resource controller.

9. The video decoder system of claim 7, wherein each of the plurality of scaling algorithms provides a unique data-pruning pattern.

10. The video decoder system of claim 7, wherein the selected scaling algorithm processes a unique pattern of DCT coefficients in an inputted block of DCT data.

11. The video decoder system of claim 10, wherein the unique pattern comprises a rectangular arrangement of DCT coefficients having a predetermined number of rows and columns.

12. The video decoder system of claim 7, wherein each of the plurality of scaling algorithms eliminates a predetermined pattern of DCT coefficients from processing.

13. The video decoder system of claim 7, wherein the system for determining a complexity level based on the inputted complexity budget includes a table that associates data patterns with complexity levels.

14. A method of scaling the processing of discrete cosine transform (DCT) blocks by an inverse discrete cosine transform (IDCT) system in a video decoder, comprising the steps of:

provide a complexity budget to the IDCT system;

selecting one of a plurality of scaling algorithms based on the complexity budget; and processing at least one DCT block using the selected scaling algorithm.

15. The method of claim 14, wherein the complexity budget is provided by a local resource controller.

16. The method of claim 14, wherein the step of selecting one of a plurality of scaling algorithms includes the step of providing a table that associates data patterns with inputted complexity levels.

17. The method of claim 14, wherein each of the plurality of scaling algorithms includes a unique data-pruning pattern.

18. The method of claim 14, wherein the at least one block of DCT data is comprised of DCT coefficients, and each of the plurality of scaling algorithms causes a unique pattern of DCT coefficients to be selected for processing.

19. The method of claim 18, wherein each unique pattern of DCT coefficients selected for processing comprises a rectangular group of DCT coefficients having a predetermined number of rows and columns.

20. The method of claim 14, wherein the at least one block of DCT data is comprised of DCT coefficients, and wherein each of the plurality of scaling algorithms eliminates a predetermined pattern of DCT coefficients from processing.

21. A system for processing discrete cosine transform (DCT) data, comprising:

a plurality of scaling algorithms, each capable of processing an inputted block of DCT data;

a system for receiving a complexity budget; and a system for implementing one of the plurality of scaling algorithms to meet the received complexity budget.

22. The scalable IDCT system of claim 21, wherein the inputted block of DCT data is comprised of DCT coefficients arranged in a grid, and each of the plurality of scaling algorithms causes a unique pattern of DCT coefficients to be selected for processing.

* * * * *